United States Patent Office …

3,178,462
PROCESS FOR THE MANUFACTURE OF 16-METH-
YLENE STEROIDS AND COMPOUNDS OB-
TAINED THEREBY
Karl-Heinz Bork, Griesheim, near Darmstadt, and Klaus
Bruckner, Heinz-Jurgen Mannhardt, Harald Metz, and
Fritz von Werder, Darmstadt, Germany, assignors to
E. Merck Aktiengesellschaft, Darmstadt, Germany
No Drawing. Filed Sept. 1, 1960, Ser. No. 53,366
Claims priority, application Germany, Sept. 23, 1959,
M 42,830
6 Claims. (Cl. 260—397.45)

Our invention relates to an improved process for the manufacture of 16-methylene steroids having pronounced anti-inflammatory activity and to certain intermediates which are useful for the preparation of such steroids.

In the copending application of Mannhardt et al., Serial No. 5,105, now U.S. Patent No. 3,074,977, there is described the preparation of 16-methylene-9α-halo-steroids of the general formula:

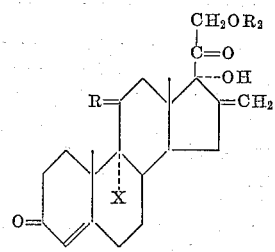

wherein $R_1$=H, OH (α or β) or =O; $R_2$=H or acyl; and X=F, Cl or Br; and which may contain a further double bond in the 1,2-position.

These compounds are prepared from 16-methylene-Reichstein's Compound S by microbiological introduction of an 11-OH group and subsequent treatment with, for example, dehydrating agents, hypohalous acids, agents capable of splitting off hydrogen halides, and $H_2F_2$.

We have found that the yields of 16-methylene-9α-halo-steroids, and particularly the 9α-fluoro compounds, according to this invention, are improved if instead of 16-methylene-Reichstein's Compound S the corresponding 21-desoxy-derivative, 16-methylene-17α-hydroxy-progesterone, is used as starting material. Our researchers have shown that 11-hydroxylation of the progesterone derivative gives better yields than hydroxylation of compounds containing an OH or O-acyl group in the 21-position.

The procedure according to the present invention is graphically illustrated by the following structural equations.

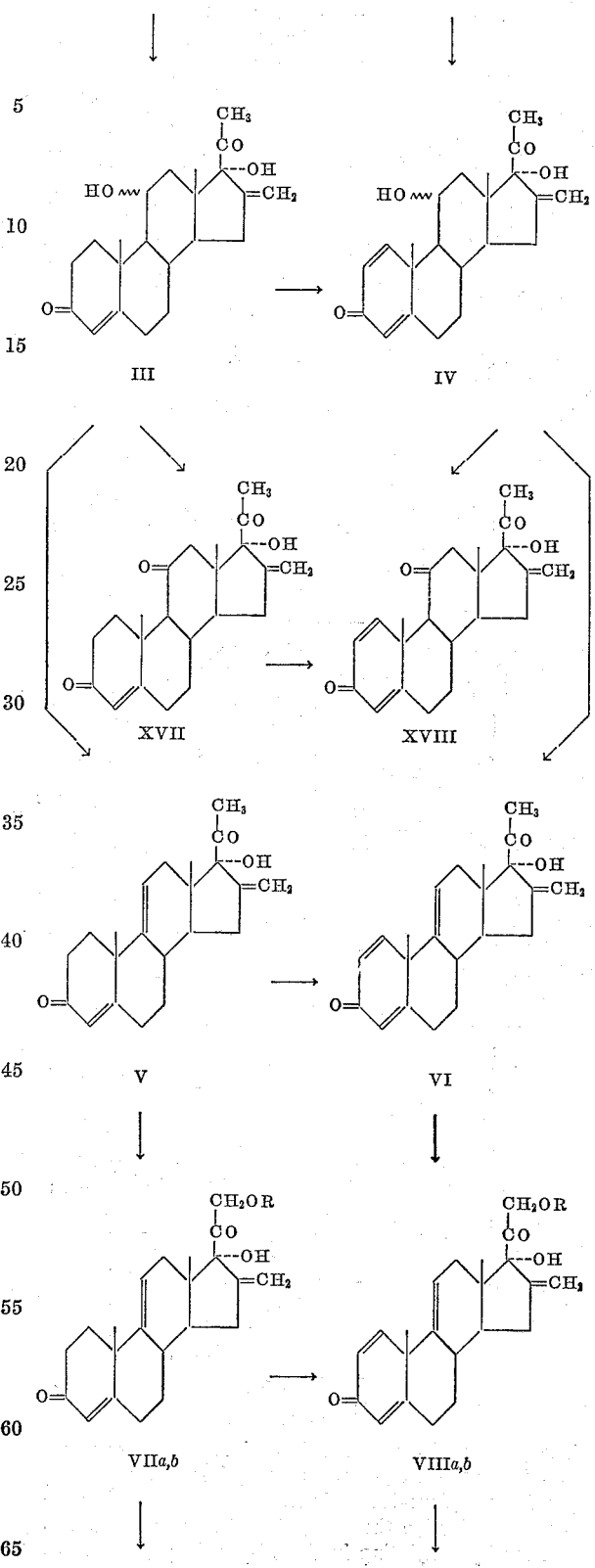

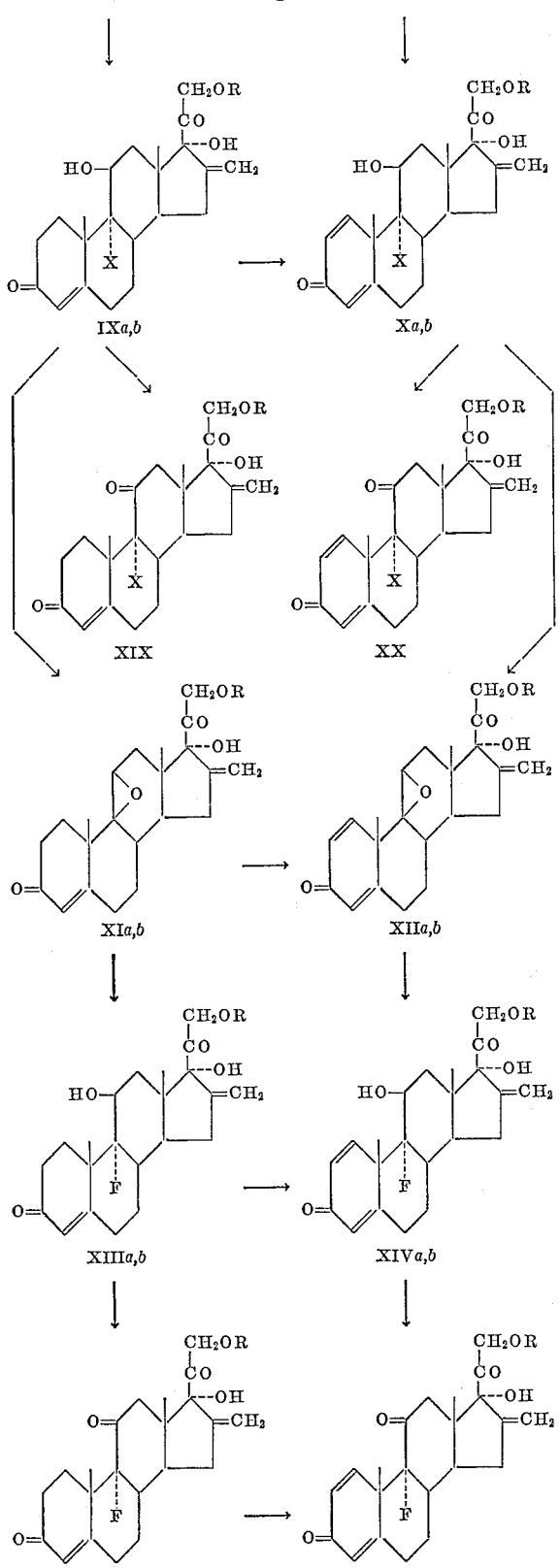

X = Cl or Br
a: R = H
b: R = Acyl

The process of the present invention for the manufacture of 16-methylene-steroids comprises the following steps: 16-methylene-17α-hydroxy-progesterone (I) or the 1-dehydro-derivative thereof (II) is treated with microorganisms hydroxylating in the 11-position; the 11,17α- dihydroxy-steroid (III or IV) thus obtained is treated by consecutive reactions with a dehydrating agent, iodine in an alkaline solution and subsequent reaction with an alkali acetate, a hypohalous acid, an agent splitting off hydrogen halides, and $H_2F_2$.

In any step of this synthesis a 1,2-double bond may be introduced. Thus steroids of the formula:

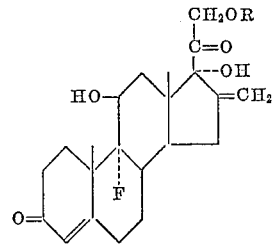

wherein R=H or acyl and which may contain a further double bond in the 1,2-position are examples of the ultimate products obtainable by the aid of our process. If desired, the 11-OH group of the intermediates or end products of these reactions may be oxidized to form an 11-keto group by known methods. The compounds of this invention may be esterified and saponified by known procedures and reagents.

The introduction of an 11-OH group is carried out microbiologically according to known methods. The following microorganisms are suitable:

11β-HYDROXYLATION

*Curvularia lunata, Cunninghamella blakesleeana, Mucor griseocyanus,* Cephalothecium sp., Trichothecium sp., *Botrytis cinerea,* Coniothyrium sp., Thamnidium sp., *Streptomyces fradiae,* Rhodoseptoria sp., Collectotrichum sp., Dothichiza sp., *Absidia glauca,* and Pycnoxporion sp.

11α-HYDROXYLATION

Rhizopus (various species), Aspergillus (var. spec.), Penicillium (var. spec.), Fusarium (var. spec.), *Neurospora sitophila,* Trichothecium sp., *Cephalothecium roseum, Pestalotia foedans, Dactylium dendroides, Heliocostylum piriforme,* Thamnidium sp., *Eurotium chevalieri, Muco javanicus* and various other species, *Delacroixia coronata, Absidia glauca, Cunninghamella echinulata,* and further fungi of the Mucorales type.

Remarkably good yields are obtained when using fungi of the genus Fusarium or Penicillium because the starting material is completely converted, so that tedious separation procedures are avoided.

It is also possible to introduce the 11-OH group already into 16β-methyl-16α, 17α-oxido-progesterone, that is a precursor of the starting material used in the process of the present invention. The 16,17-oxido ring may be opened after the 11-hydroxylation by heating the compound in benzene with addition of catalytic amounts of a strong acid to form 16-methylene - 11,17α - dihydroxy-progesterone (III).

The 11-hydroxy-steroids may be dehydrated according to known methods to form the 9,11-unsaturated steroids. For the 11β-hydroxy-steroids all usual trans-dehydrating agents are suitable, such as $POCl_3$ or $SOCl_2$ in pyridine. For 11α-hydroxy-steroids, all usual cis-dehydrating methods are suitable, such as esterification of the 11α-hydroxyl-group and subsequent elimination of the corresponding acid by a basic agent or by a thermal reaction.

The introduction of a 21-acetoxy or other acyloxy group is possible in various reaction steps of this invention. The 11(α or β)-hydroxy-steroids (III or IV), the 9,11-unsaturated steroids (V or VI) and the corresponding 9,11-oxido-steroids are suitable for this reaction. The steroid is treated with iodine in an alkaline solution and then with potassium acetate or other organic alkali metal salt.

For example, the iodine is added to a solution of the steroid in a suitable solvent, such as a mixture of tetrahydrofurane and methanol, and aqueous NaOH is added dropwise to the reaction mixture. The 21-iodo-compound thus obtained is reacted without isolation with potassium acetate or other salt to form the corresponding 21-acetoxy or other acyloxy compound.

To the 9,11-double bond of 16-methylene-4,9(11)-pregnadiene (VII) or of 16-methylene-1,4,9(11)-pregnatriene (VIII), a hypohalous acid may be added, preferably HOBr or HOCl. The 11β-hydroxy-9α-chloro- or 11β-hydroxy-9α-bromo steroids (IX or X) thus obtained may be converted into the corresponding 9β,11β-oxido compounds (XI or XII) by known methods, for example, by reaction with an alkali acetate.

By reaction of the 9β-11β-oxido compound (XI or XII) with $H_2F_2$ the corresponding 9α-fluoro-11β-hydroxy steroids (XIII or XIV) are obtained.

The compounds III and IV, IX and X, XIII and XIV may be oxidized to form the corresponding 11-keto compounds. A mixture of chromic acid and pyridine or a hypohalous acid is a suitable oxidizing agent for this reaction.

As will be evident from the reaction diagram, a double bond in the 1,2-position may be introduced at any stage of the process. Chemical as well as microbiological reactions are suitable for this dehydrogenation. A chemical dehydrogenating agent, for example, is $SeO_2$. The reaction is preferably carried out in a solution of tertiary butanol with small amounts of acetic acid. The mixture is refluxed, the precipitated selenium separated, and the filtrate contains the compound dehydrogenated in the 1,2-position.

For the introduction of a double bond in the 1,2-position the following microorganisms are suitable: *Bacillus sphaericus, Fusarium solani, Corynebacterium simplex* and *hoagii, Alternaria* sp., *Mycobacterium smegmatis, Calonectria decora, Mycobacterium lacticola, Ophiobolus* sp., *Alcanigenes* sp. *Didymella lycopersici, Protaminobacter* sp., *Septomyxa affinis, Nocardia* sp., *Cylindrocarpon radicicola, Streptomyces lavendulae, Bacillus cyclooxydans*.

Depending on the microorganism, 4 to 14 hours are necessary for the fermentation. Particularly suitable are cultures of *Bacillus sphaericus* var. *fusiformis* and *Corynebacterium simplex*.

The products obtained according to this invention may be esterified if they contain one or more OH-groups, for example in the 11,17- and/or 21-position. For these reactions, the following acids or their derivatives suitable for esterification may be used: acetic acid and the homologues thereof, such as propionic, tert. butyl acetic, valeric and palmitic acids; olefinic acids like undecylenic acid; dibasic aliphatic acids like succinic acid and the homologues thereof; halogenocarboxylic acids such as cloro-acetic acid; amino- and alkylaminocarboxylic acids such as diethylamino acetic acid; phthalic and tetrahydrophthalic acids, amino-dicarboxylic acids such as aspartic acid; cyclopentylpropionic and cyclohexylpropionic acids; sulfuric acid, phosphoric acid, etc.

On the other hand, it is possible to saponify acyl groups present in the 11,17- and/or 21-position of the compounds prepared by the process of this invention. For this reaction, for example, an aqueous solution of $NaHCO_3$ is suitable. Oxygen is preferably excluded from these reactions.

The starting material, 16-methylene-17α-hydroxy-progesterone may be obtained in several ways. For example, it may be prepared in an analogous manner to the process described in the above-mentioned copending application by heating 16β-methyl-16α,17α-oxido-pregnenolone or the 3-acetate thereof in benzene or in another inert solvent containing at least catalytic amounts of a strong acid, such as p-toluenesulfonic acid. Thus the 16α,17α-oxido ring is split to form 16-methylene-17α-hydroxy-pregnenolone. 16-methylene-17α-hydroxy-pregnenolone or the 3-acetate thereof may be converted by treatment with a culture of *Flavobacterium dehydrogenans* into 16-methylene-17α-hydroxy-progesterone. For *Flavobacterium dehydrogenans* a solution of a yeast extract (1%) in water, buffered to pH 7, is suitable as nutrient medium. The steroid compound is added to this culture after an incubation period of from 10 to 16 hours at 28° C.

16β-methyl-16α,17α-oxido-pregnenolone may be converted into 16β-methyl-16α,17α-oxido-4-pregnene-3,20-dione also by an Oppenauer oxidation. The latter compound yields 16-methylene-17α-hydroxy-progesterone when heated with a strong acid in a neutral solvent like benzene. The 16β-methyl-16α,17α-oxido-pregnenolone and the 3-acetate thereof are obtained from 16-methyl-5,16-pregnadiene-3β-ol-20-one 3-acetate.

16-methylene-17α-hydroxy-progesterone (I) may also be prepared by reaction of 16-methyl-4,16-pregnadiene-3,20-dione with per-acids or with $H_2O_2$ in the presence of a mild alkaline agent, such as $K_2CO_3$, resulting first in the corresponding 16α,17α-oxido compound which is then converted into the desired starting material (I) by heating with a strong acid in benzene or other inert solvent.

The process according to the present invention represents an essential technical advance compared to the method of manufacturing 16-methylene-steroids proposed in U.S. Patent No. 2,865,808, according to which 9α-fluoro-16-methylene-prednisolone is prepared from 16α-hydroxyhydrocortisone in 14 steps, whereas according to the present invention the same compound is prepared from pregnadienolone-3-acetate in 11 steps. It should also be noted that the preparation of 16α-hydroxyhydrocortisone from pregnadienolone-acetate itself requires 10 steps.

The 16-methylene-corticoids obtained according to the present invention are useful as antiphlogistic drugs. They are suitable particularly for the treatment of rheumatoid arthritis and refractory allergies.

The invention is described in greater detail in the following examples which are presented for purposes of illustration only and not as indicating the limits of the invention.

EXAMPLE 1

*9α-fluoro-16-methylene-hydrocortisone* (XIIIa)

A. MICROBIOLOGICAL 11α-HYDROXYLATION OF I

In a fermentation vessel 15 l. of a nutrient medium containing 3% saccharose, 1% malt extract, 0.1% yeast extract, 0.2% $NaNO_3$, 0.1% $KH_2PO_4$, 0.05% $MgSO_4 \cdot 7H_2O$, 0.01% $FeSO_4 \cdot 7H_2O$, buffered to pH 6.8, are inoculated with 750 ml. of a culture of *Penicillium* sp. (Collection E. Merck No. 2168). After a growth of 30 hours, 5 g. of 16-methylene-17α-hydroxy-progesterone dissolved in 300 ml. of methanol are added. The reaction is terminated after 15 hours. The solution is extracted with chloroform, the combined extracts are evaporated and the residue is washed with petroleum ether. The undissolved material is isolated and recrystallized from ethyl acetate. 16-methylene-4-pregnene-11α,17α-diol-3,20-dione (III) melts at 208–210°. $(\alpha)_D$ −8.4°, λ max. 241–242 mμ, E 462.

B. DEHYDRATION OF III 9.2 g. of 16-methylene-4-pregnene-11α,17α-diol-3,20-dione are dissolved in 92 ml. of pyridine. 11.2 g. of p-toluenesulfonic acid chloride are added with cooling and shaking. The mixture is allowed to stand overnight and is poured into aqueous HCl (5%) while being cooled with ice. The precipitate is sucked off, washed with water, dried and recrystallized from ethyl acetate. Melting point of the tosylate 162°, $(\alpha)_D$ −2° (chloroform). λ max. 229.5 mμ;

$E_{1 cm.}^{1\%}$ 499

11 g. of the tosylate in 125 ml. of acetic acid are refluxed for 30 minutes with 10.3 g. of anhydrous sodium acetate. The mixture is poured into water and the precipitated 16-methylene - 4,9(11) - pregnadiene-17α-ol-3,20-dione (V) is sucked off and recrystallized from ethyl acetate. M.P. 227–228°. λ max. 238–239 mμ, E 530, [α]$_D$ —23° (chloroform).

C. 21-ACETYLATION OF V

To a solution of 4.6 g. of 16-methylene-4,9(11)-pregnadiene-17α-ol-3,20-dione (V) in a mixture of 100 ml. of tetrahydrofurane and 12 ml. of methanol, 7.3 g. of iodine are added at 0°. Within 1 hour, an aqueous solution of NaOH (10%) is added dropwise until the colour of iodine has disappeared. After another hour, the solution is poured into water, the precipitate taken up with ether, the combined ether extracts are washed with water, dried and evaporated. The crude 21-iodo-compound is refluxed for 24 hours in 300 ml. of acetone with 13.5 g. of anhydrous potassium acetate. Then the solution is concentrated and water added. The precipitated 16-methylene - 4,9(11) - pregnadiene-17α,21-diol-3,20-dione-21-acetate (VIIb) is recrystallized from acetone or methanol. λ max. 238 mμ. M.P. 210–212°, [α]$_D$ +51° (chloroform);

$E^{1\%}_{1cm}$ 421

D. ADDITION OF HOBr TO VII 7.8 g. of 16-methylene-4,9(11)-pregnadiene-17α,21-diol-3,20-dione-21-acetate (VIIb) are dissolved in a mixture of 315 ml. of dioxane and 40 ml. of water. 4.55 g. of N-bromosuccinimide and 1.68 ml. of perchloric acid (70%) are added. After standing for 1 hour at room temperature, the solution is poured into water, the precipitate sucked off, washed with water and dried. The crude 9α-bromo-16-methylene-hydrocortisone-21-acetate (IXb) is used without further purification. λ max. 243 mμ.

E. ELIMINATION OF HBr FROM IX

The crude 9α-bromo-16-methylene-hydrocortisone-21-acetate (IX) obtained according to Example 1D is dissolved in 450 ml. of ethanol. After addition of 19 g. of potassium acetate the mixture is refluxed for 2 hours, poured into water and the emulsion thus obtained is extracted with chloroform. From these extracts the 9β,11β-oxido - 16 - methylene-4-pregnene-17α,21-diol-3,20-dione-21-acetate (XIb) is obtained which is recrystallized from methanol. λ max. 243 mμ. M.P. 210–211°; [α]$_D$ —34.7° (dioxane);

$E^{1\%}_{1cm}$ 390

F. SPLITTING OF THE OXIDO RING OF XI 4.3 g. of 9β,11β - oxido - 16 - methylene-4-pregnene-17α,21-diol-3,20-dione-21-acetate (XIb) are dissolved in 45 ml. of anhydrous chloroform and added at —60° C. to 25 ml. of a mixture prepared from 400 ml. of tetrahydrofurane, 150 ml. of chloroform and 250 g. of H$_2$F$_2$. The mixture stands for 4 hours at —30°, then 4 hours at 0° and is poured into a solution of NaHCO$_3$. The emulsion is extracted with chloroform. Upon evaporation and recrystallization from acetone 9α-fluoro-16-methylene-hydrocortisone-21-acetate (XIIIb) is obtained. λ max. 238 mμ. M.P. 202–204°, [α]$_D$ +17.4° (chloroform).

G. SAPONIFICATION OF XIII 1 g. of 9α-fluoro-16-methylene-hydrocortisone-21-acetate (XIIIb) is dissolved in 50 ml. of methanol. While introducing N$_2$, 2 ml. of a solution of K$_2$CO$_3$ saturated with N$_2$ are added. The mixture is stirred for 30 minutes at room temperature, neutralized with 1.7 ml. of acetic acid, diluted with water and extracted with chloroform. After evaporation 9α-fluoro-16-methylene-hydrocortisone (XIIIa) is obtained. λ max. 238 mμ;

$E^{1\%}_{1cm}$ 449

M.P. 242–244°; (α)$_D$ +80° (dioxane).

EXAMPLE 2

16-methylene-4,9(11)-pregnadiene-17α-ol-3,20-dione (V)

A. MICROBIOLOGICAL 11β-HYDROXYLATION 15 l. of a nutrient medium prepared according to Example 1A are inoculated with 750 ml. of a culture of *Curvularia lunata* (Wakker) Boedijn. After growth of 18 hours at 28°, 5 g. of 16-methylene-17α-hydroxyprogesterone in 300 ml. of methanol are added. The starting material has disappeared after 24 hours. The solution is extracted with chloroform and evaporated. After treatment with petroleum ether and recrystallization from ethyl acetate 16 - methylene - 4 - pregnene-11β,17α-diol-3,20-dione (III) is obtained. M.P. 216–217°, (α)$_D$ +43° (chloroform); λ max. 241–242 mμ;

$E^{1\%}_{1cm}$ 454

B. DEHYDRATION OF III 25.3 g. of 16-methylene-4-pregnene-11β,17α-diol-3,20-dione (III) prepared according to Example 2A are dissolved in 300 ml. of pyridine. 4.25 ml. of SOCl$_2$ are added and the solution is heated to 100° for 30 minutes. The mixture is poured into water, the precipitate sucked off, washed and dried. 16-methylene-4,9(11)-pregnadiene-17α-ol-3,20-dione (V) is recrystallized from ethyl acetate. M.P. 227°, (α)$_D$ —23° (chloroform).

EXAMPLE 3

9α-fluoro-16-methylene-prednisolone (XIVa)

A-1. MICROBIOLOGICAL 1,2-DEHYDROGENATION OF I

In a fermentation vessel 15 l. of a nutrient solution containing 1% yeast extract (pH 6.8) are inoculated with 0.5 l. of a culture of *Bacillus sphaericus*. After 9 hours at 28°, 8 g. of 16-methylene-4-pregnene-17α-ol-3,20-dione (I) are added in 230 ml. of methanol. The dehydrogenation is terminated after about 25–30 hours. The solution is extracted with chloroform and 16-methylene-1,4-pregnadiene-17α-ol-3,20-dione (II) is obtained from the combined extracts.

A-2. CHEMICAL 1,2-DEHYDROGENATION OF I 8.3 g. of 16-methylene-4-pregnene-17α-ol-3,20-dione (I) are dissolved in 170 cc. of dioxane and refluxed with 8.3 g. of 2,3-dichloro-5,6-dicyano-para-benzoquinone for 8 hours. The reaction mixture is diluted with chloroform, washed subsequently with water, 70 cc. of sodium hydroxide (1 n) and again with water. By recrystallization from acetone/ether, the pure 16-methylene-1,4-pregnadiene-17α-ol-3,20-dione (II) is obtained.

B. MICROBIOLOGICAL 11-HYDROXYLATION OF II

According to Example 1A, 16-methylene-1,4-pregnadiene-11α,17α-diol-3,20-dione (IV) is prepared from II.

According to Example 2A, 16-methylene-1,4-pregnadiene-11β,17α-diol-3,20-dione (IV) is prepared from II. M.P. 230–232° C. [α]$_D$ —37.5° (chloroform).

C. DEHYDRATION OF IV

According to Example 1B or 2B, 16-methylene-1,4,9(11)-pregnatriene-17α-ol-3,20-dione (VI) is prepared from IV.

D. According to Example 1C, 16-methylene-1,4,9(11)-pregnatriene-17α,21-diol-3,20-dione-21-acetate (VIII) is prepared from VI.

E. According to Example 1D, 9α-bromo-16-methylene-1,4 - pregnadiene - 11β,17α,21 - triol - 3,20 - dione - 21-acetate (X) is prepared from VIII.

F. According to Example 1E, 9,11-oxido-16-methylene - 1,4 - pregnadiene - 17α,21 - diol - 3,20 - dione - 21-acetate (XIIb) is prepared from X.

G. According to Example 1F, 9α-fluoro-16-methylene-prednisolone-21-acetate (XIVb) is prepared from XII. M.P. 223–224°; λ max. 238 mμ, $E^{1\%}_{1cm}$ 379

H. According to Example 1G, 9α-fluoro-16-methylene-prednisolone (XIVa) is obtained from XIVb by saponification. M.P. 246–248°; (α)_D +26.6° (dioxane).

EXAMPLE 4

*9α-fluoro-16-methylene-prednisolone 21-acetate (XIVb)*

A–1. MICROBIOLOGICAL 1,2-DEHYDROGENATION OF XIII

In a fermentation vessel 15 l. of a nutrient medium containing 1% yeast extract (pH 6.8) are inoculated with 0.5 l. of a culture of *Bacillus sphaericus*. After 10 hours, 7.5 g. of 9α-fluoro-16-methylene-hydrocortisone (XIIIa) are added in 300 ml. of methanol. The reaction is terminated after about 28–36 hours. The solution is extracted with chloroform. 9α-fluoro-16-methylene-prednisolone (XIVa) is recrystallized from ethanol.

A–2. CHEMICAL 1,2-DEHYDROGENATION OF XIII

According to Example 3A–2, 3 g. of 9α-fluoro-16-methylene-hydrocortisone-21-acetate (XIIIb) are dehydrogenated. 9α - fluoro - 16 - methylene - prednisolone - 21-acetate (XIVb) is recrystallized from acetone.

EXAMPLE 5

*9α-fluoro-16-methylene-cortisone (XVa)*

OXIDATION OF XIII 2.5 g. of 9α-fluoro-16-methylene-hydrocortisone-21-acetate (XIIIb) are dissolved in 25 ml. of pyridine and added to a mixture of 2.5 g. of chromic acid anhydride and 25 ml. of pyridine. After 12 hours, the reaction mixture is poured into 250 ml. of ethyl acetate and refluxed for 5 minutes. The precipitate is filtered with suction and washed with hot ethyl acetate. The filtrates are neutralized with diluted sulfuric acid, dried and concentrated. The crude 9α-fluoro-16-methylene-cortisone-21-acetate (XVb) is recrystallized from methanol or ethyl acetate.

According to Example 1G the acetate (XVb) may be saponified to form 9α - fluoro - 16 - methylene - cortisone (XVa).

EXAMPLE 6

*9α-fluoro-16-methylene-prednisolone 21-acetate (XIVb)*

OXIDATION OF XIV

According to Example 5, 9α-fluoro-16-methylene-prednisolone-21-acetate (XIVb) is oxidized to form 9α-fluoro-16-methylene-prednisone-acetate (XVIb).

The acetate XVIb may be saponified according to the procedure of Example 1G to form the alcohol XVIa.

EXAMPLE 7

*9α-fluoro-16-methylene-prednisone (XVIa)*

1,2-DEHYDROGENATION OF XV

According to Example 3A–1 or 3A–2, 7.5 g. of 9α-fluoro-16-methylene-cortisone (XVa) are dehydrogenated to form 9α-fluoro-16-methylene-prednisone (XVIa).

The acetate XVIb may be saponified according to Example 1G to form XVIa.

EXAMPLE 8

*9α-bromo-16-methylene prednisone 21-acetate (XXb)*

A. PREPARATION OF XVII FROM III 2.3 g. of 16-methylene-4-pregnene-11α,17α-diol-3,20-dione (III) are dissolved in 23 ml. of anhydrous pyridine. A mixture of 2.3 g. of chromic acid anhydride and 23 ml. of pyridine are added at 0°. After 12 hours, the mixture is poured into 250 ml. of ethyl acetate. The precipitate is filtered with suction and washed with ethyl acetate. From the combined solutions 16-methylene-4-pregnene-17α-ol-3,11,20-trione (XVII) is crystallized.

In an analogous manner, 16-methylene-4-pregnene-11β,17α-diol-3,20-dione (III) may be oxidized to form 16-methylene-4-pregnene-17α-ol-3,11,20-trione (XVII).

B. PREPARATION OF XVIII FROM IV

According to Example 5 or 8A, 16-methylene-1,4-pregnadiene-17α-ol-3,11,20-trione (XVIII) may be prepared from IV (α- or β-OH).

C. PREPARATION OF XIX FROM IX

According to Example 8A, 9α-bromo-16-methylene-hydrocortisone-21-acetate (IXb) may be oxidized to form 9α-bromo-16-methylene-cortisone-acetate (XIXb).

The acetate XIXb may be saponified to form XIXa according to Example 1G.

D. PREPARATION OF XX FROM X

According to Example 8A, 9α-bromo-16-methylene-prednisolone-21-acetate (Xb) may be oxidized to form 9α-bromo-16-methylene-prednisone-21-acetate (XXb).

The acetate XXb may be saponified to XXa according to Example 1G.

EXAMPLE 9

*16-methylene-1,4-pregnadiene-17α-ol-3,11,20-trione (XVIII)*

A–1. MICROBIOLOGICAL 1,2-DEHYDROGENATION OF XVII AND XIX

According to Example 4A–1, 7.5 g. of 16-methylene-4-pregnene-17α-ol-3,11,20-trione (XVII) are dehydrogenated. From the chloroform extracts 16-methylene-1,4-pregnadiene-17α-ol-3,11,20-trione (XVIII) is crystallized.

In an analogous manner XIXa may be dehydrogenated to form 9α-bromo-16-methylene-1,4-pregnadiene-17α,21-diol-3,11,20-trione (XXa).

A–2. CHEMICAL DEHYDROGENATION OF XVII AND XIX 11 g. of 16-methylene-4-pregnene-17α-ol-3,11,20-trione (XVII) are dehydrogenated according to Example 3A–2. The so formed 16-methylene-1,4-pregnadiene-17α-ol-3,11,20-trione (XVIII) is filtered over silica gel.

In an analogous manner XIXb may be dehydrogenated to form 9α-bromo-16-methylene-1,4-pregnadiene-17α,21-diol-3,11,20-trione-21-acetate (XXb).

We claim
1. A member of the group consisting of a compound of the formula

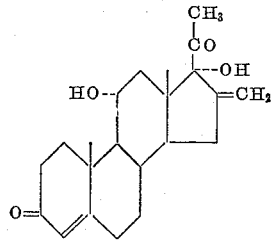

and the 1-dehydro derivative thereof.

2. A member of the group consisting of a compound of the formula

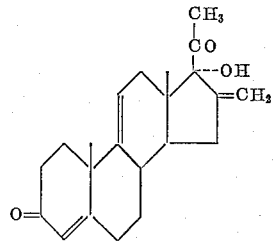

and the 1-dehydro derivative thereof.

3. 16-methylene-4-pregnene-11alpha,17alpha-diol-3,20-dione.

4. 16-methylene-1,4-pregnadiene-11alpha,17alpha-diol-3,20-dione.

5. 16-methylene-4,9(11)-pregnadiene-17alpha-ol-3,20-dione.

6. 16-methylene-1,4,9(11)-pregnatriene-17alpha-ol-3,20-dione.

References Cited by the Examiner

UNITED STATES PATENTS

| | | | |
|---|---|---|---|
| 2,602,769 | 7/52 | Murray et al. | 195—51 |
| 2,865,808 | 12/58 | Agnello et al. | 167—65 |
| 2,915,433 | 12/59 | Agnello et al. | 167—65 |
| 2,954,386 | 9/60 | Beyler | 260—397.47 |
| 2,958,702 | 11/60 | Taub et al. | 260—397.45 |

LEWIS GOTTS, *Primary Examiner.*

MORRIS LIEBMAN, LESLIE H. GASTON, *Examiners.*